United States Patent [19]

Giust et al.

[11] Patent Number: 5,237,168
[45] Date of Patent: Aug. 17, 1993

[54] CONTROL OF THE LEVEL OF ILLUMINATION PREMISES

[75] Inventors: Henri Giust, Naviglio, Italy; Bernard J. Grehant, Barberaz; Marc Thery, Mures, both of France

[73] Assignee: Somfy, Cluses, France

[21] Appl. No.: 882,616

[22] Filed: May 13, 1992

[30] Foreign Application Priority Data

May 22, 1991 [FR] France .................. 91 06160

[51] Int. Cl.$^5$ .................................... H01J 40/14
[52] U.S. Cl. .................. 250/214 AL; 250/551
[58] Field of Search ........ 250/214 AL, 214 R, 214 C, 250/205, 551; 315/149, 152, 156, 158

[56] References Cited

U.S. PATENT DOCUMENTS 4,273,999 6/1981 Pierpoint .................. 250/214 AL
5,019,747 5/1991 Morita et al. .............. 250/214 AL Primary Examiner—David C. Nelms
Attorney, Agent, or Firm—Laff, Whitesel, Conte & Saret

[57] ABSTRACT

An installation for the control of the level of illumination of premises provided with openings towards the outside and acting on means for blocking the openings or on means for variable artificial illumination associated with controllable operating devices, on the one hand by means of contacts which can be actuated manually and, on the other hand, by an automatic control comprising a logical processing unit depending on a reference value corresponding to a level of illumination established by the user and recorded by the LPU. The photosensitive means measuring the illumination are mounted on a mobile module in which the LPU is also preferably mounted. The reference value is established by means of the contacts and is recorded in the LPU either automatically or by actuating a third contact.

13 Claims, 7 Drawing Sheets

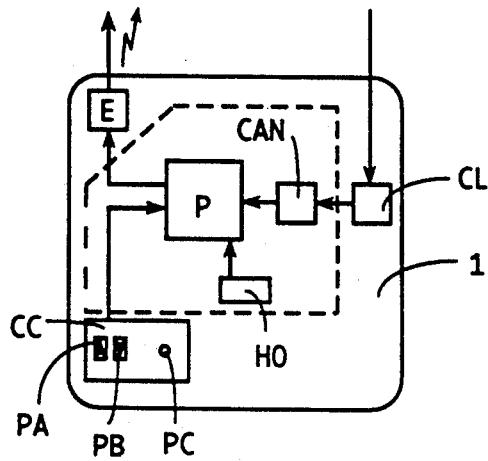
FIG 1
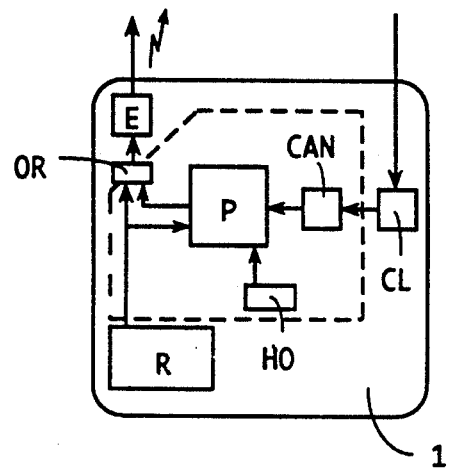
FIG 6
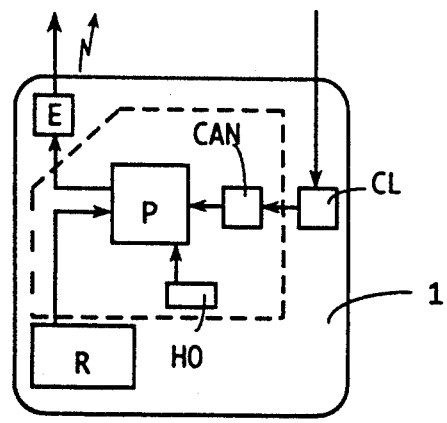
FIG 5
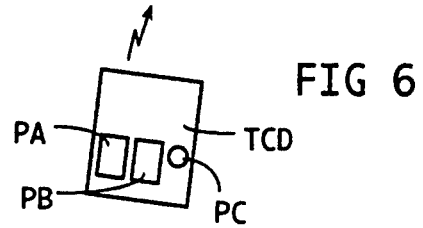

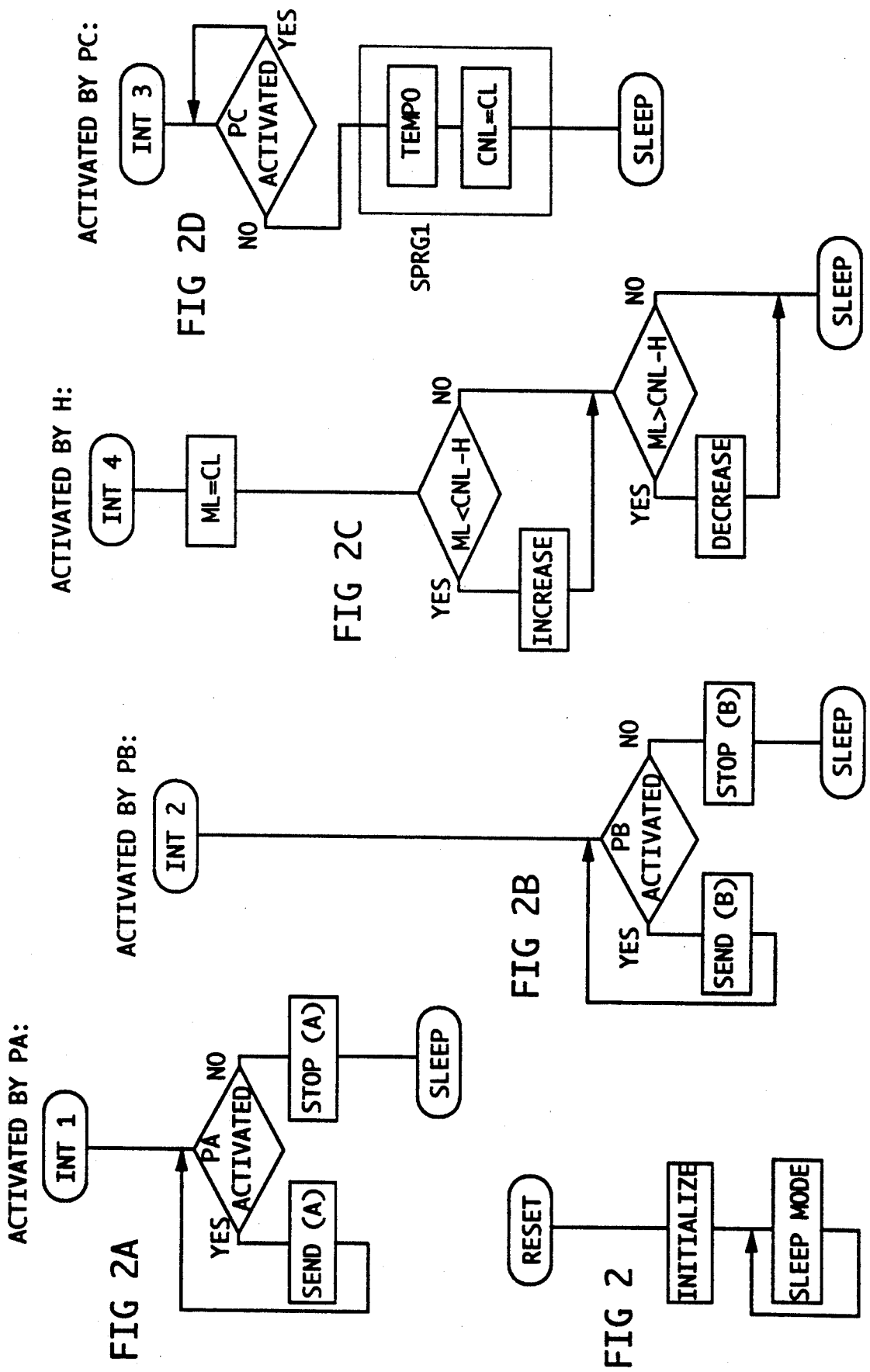

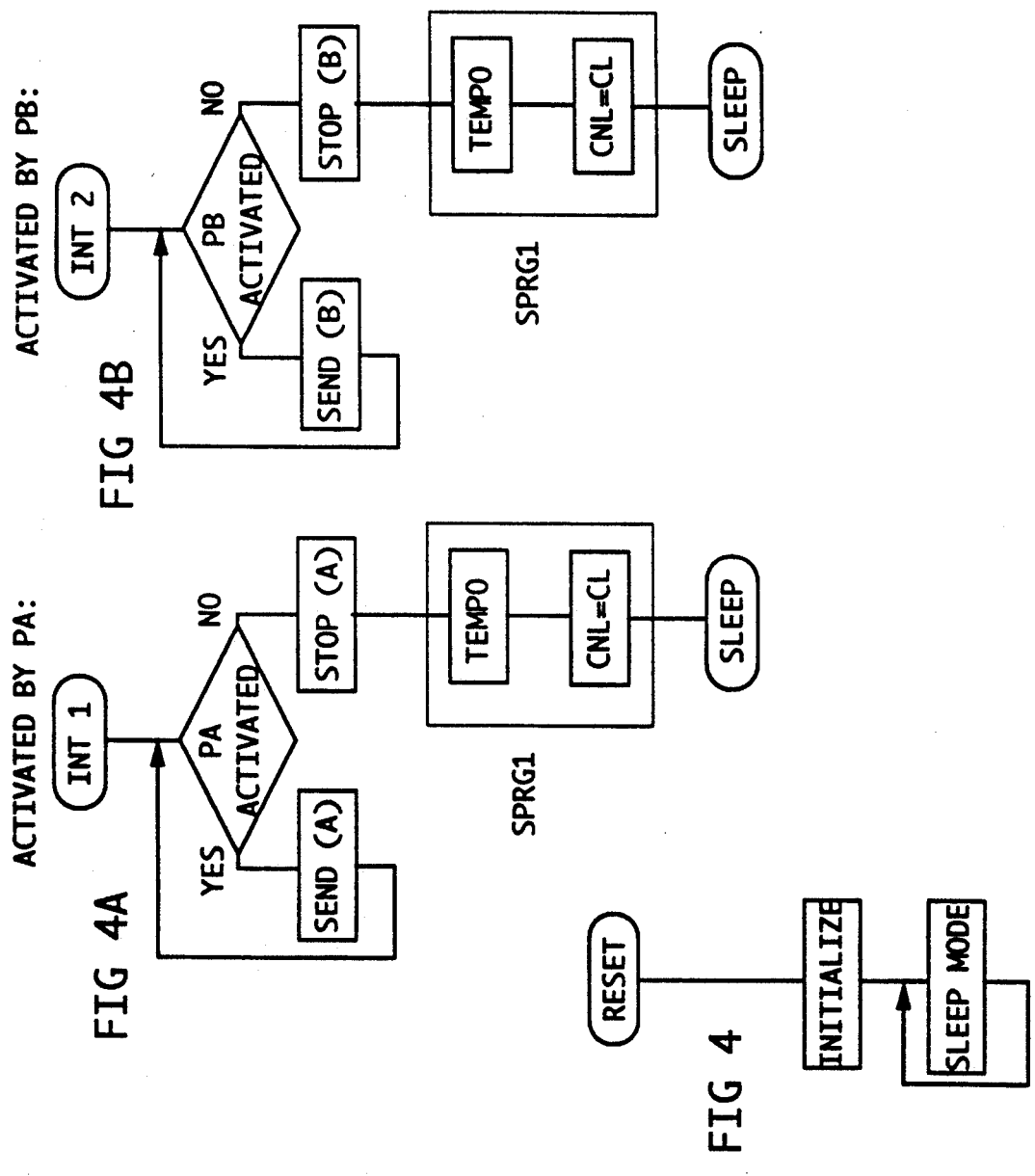

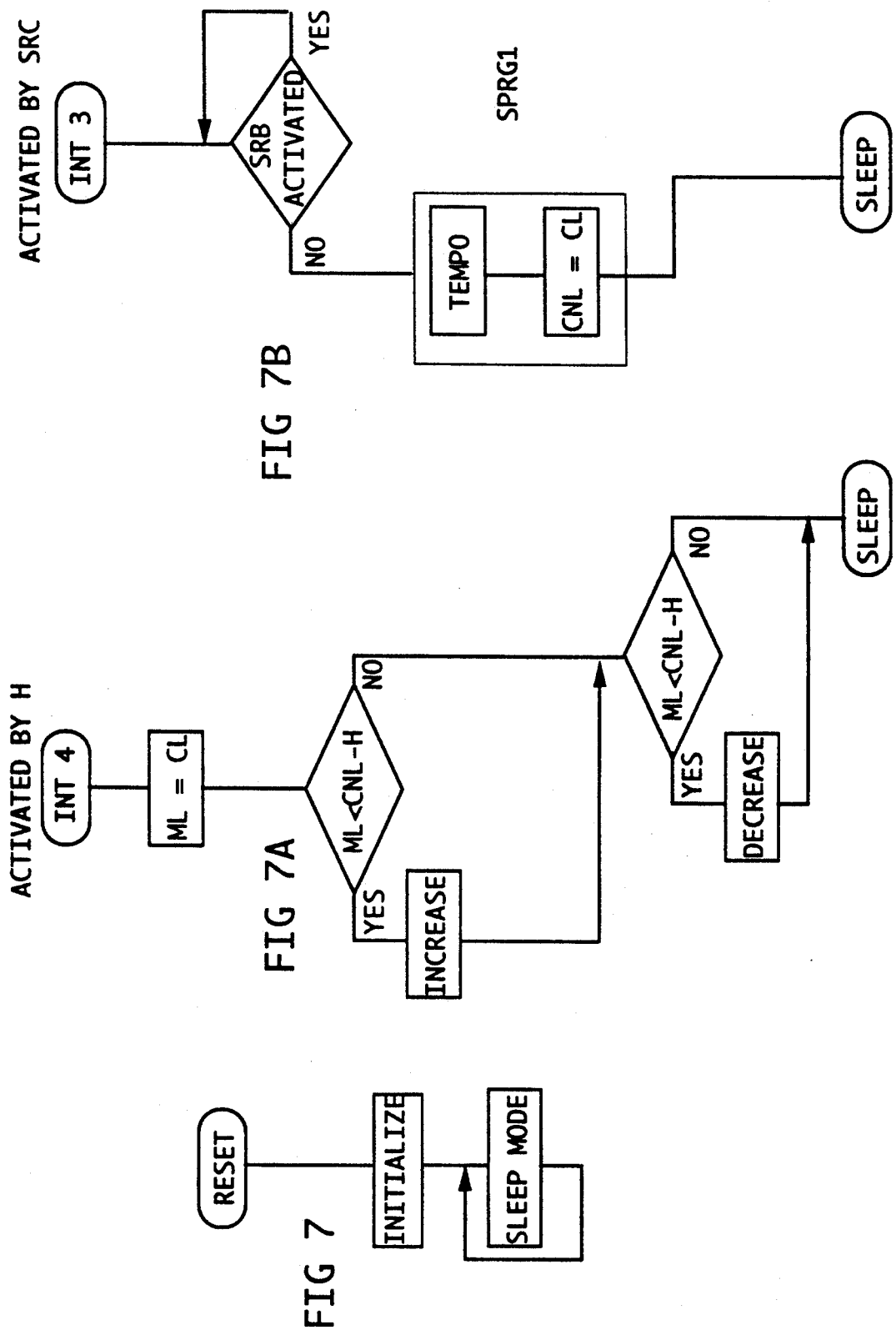

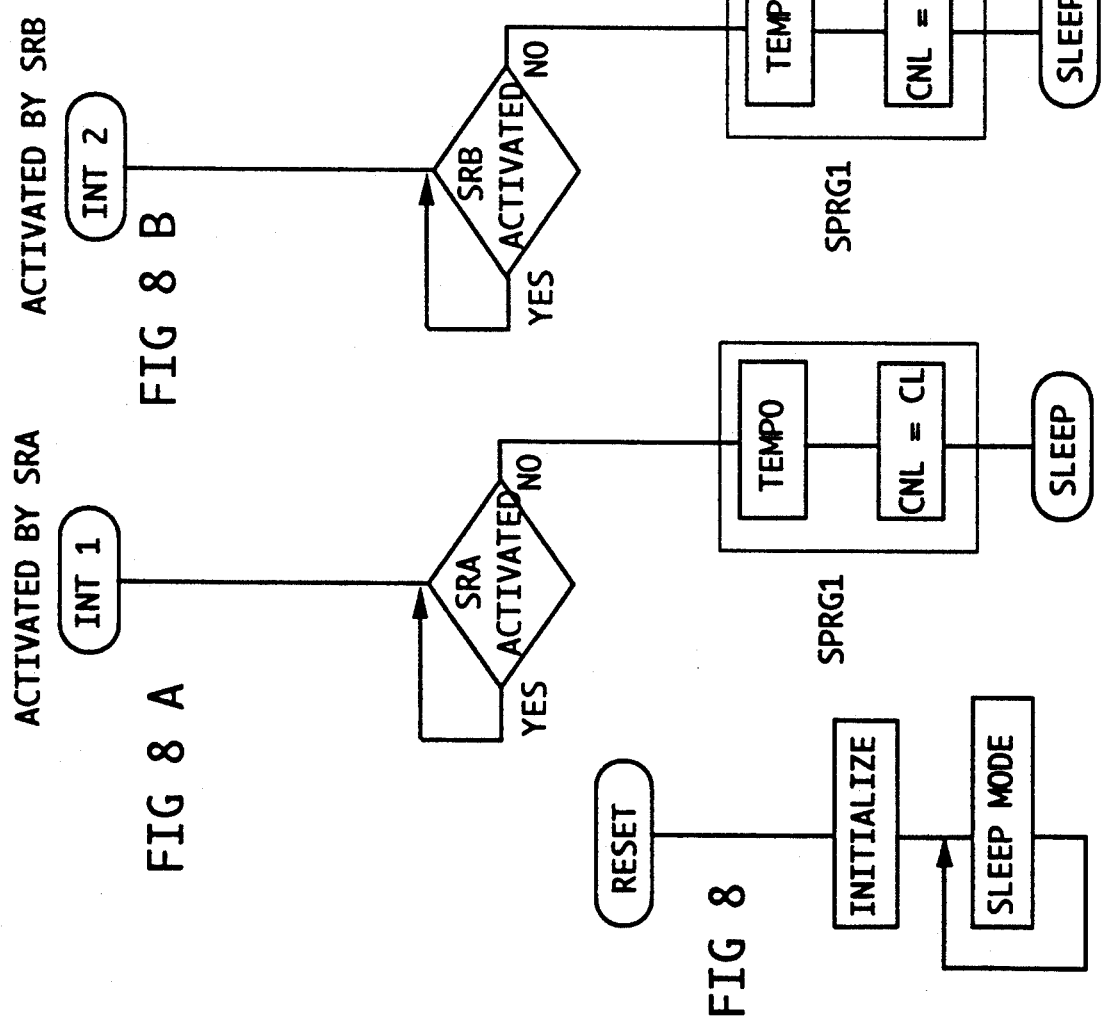

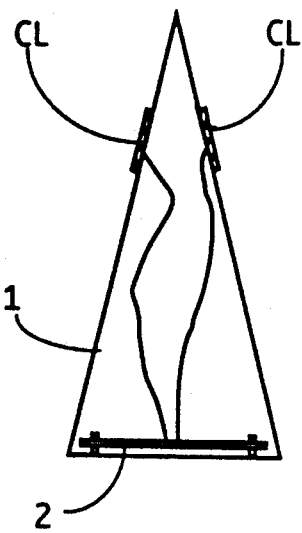
FIG 9
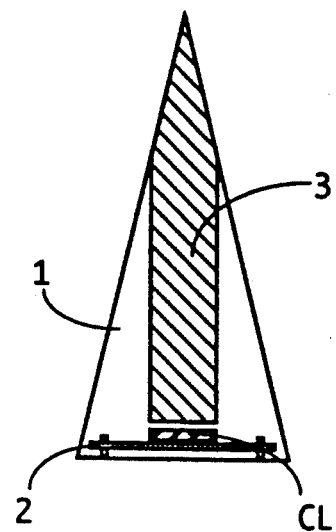
FIG 10
FIG 12
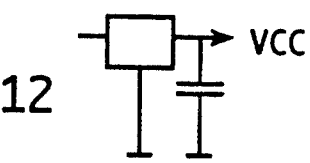
FIG 13
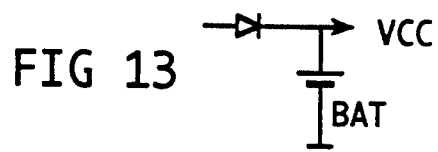
FIG 11
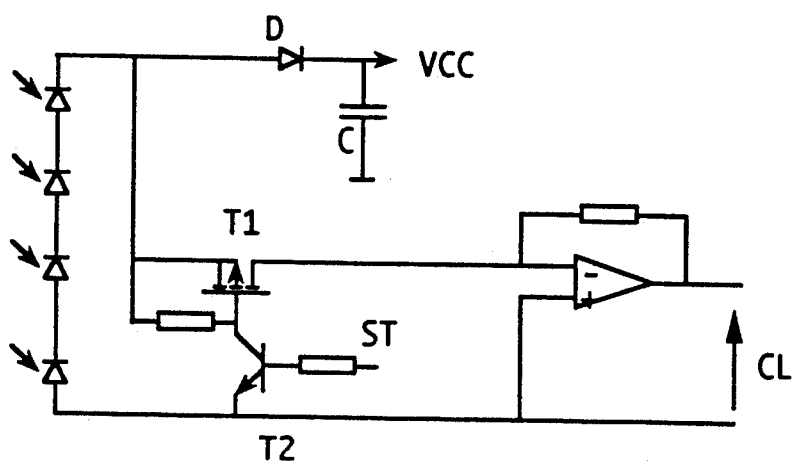

CONTROL OF THE LEVEL OF ILLUMINATION PREMISES

FIELD OF THE INVENTION

The present invention relates to an installation for the control of the level of illumination of premises provided with at least one opening allowing natural light to enter and equipped with means of blocking said opening and/or with means of artificial illumination, means associated with control operating devices, this installation comprising photosensitive means for measuring the level of illumination, means for the automatic control of the operating devices controlled by the photosensitive means as a function of a reference value of illumination, means for adjusting and storing this reference value and contacts which can be actuated manually in order to give the operating devices commands corresponding to more or less illumination.

PRIOR ART

It is known how to control blocking means, such as Venetian blinds or devices with directable slats, by using an electrical control circuit driven by a photoelectric cell. Such installations are described in U.S. Pat. Nos. 3,646,985 and 4,622,470. In these installations, the photoelectric cell is fixed and the reference value is determined by means of a potentiometer. In order to record a reference value corresponding to the desired level of illumination, the user must first act upon the potentiometer, which causes the variation in the state of the blocking means. It is then necessary to wait for this blocking means to become stabilized, and after that to assess the illumination obtained. If the latter does not correspond to the desired level, the user must repeat the operation. The reference value is thus obtained by successive approximations, and experience shows that it is necessary to repeat the operation at least three or four times in order to obtain approximately the desired adjustment, this being so only as long as the illumination does not vary during these operations because of, for example, the passage of clouds.

SUMMARY OF THE INVENTION

The aim of the invention is to find a remedy for these disadvantages and, more especially, to enable the reference value of the desired level of illumination to be adjusted in a single operation and, in addition, at the desired location in the premises, a location capable of varying with the position of the user in the premises.

The control installation according to the invention is characterized in that the means of adjusting the reference value consist of contacts which can be actuated manually, in that the means of automatic control comprise a logical processing unit (LPU) connected electrically to the photosensitive means, to the contacts which can be actuated manually and to the operating devices, this logical processing unit being programmed to read the state of the contacts, the values measured by the photosensitive means and to emit signals corresponding to more or less illumination in the direction of the operating devices, on the one hand as a function of the state of said contacts and, on the other hand, as a function of the difference between the reference value and the value measured by the photosensitive means, the program of the logical processing unit comprising a sub-routine making it possible to record, in a memory section, at an instant determined by the user, a value of the illumination measured by the photosensitive means, the said sub-routine being activated either manually by an additional contact which can be actuated manually, or automatically, and in that the photosensitive means at least are placed on or in a mobile module.

The user can thus determine the reference value directly and instantaneously by action on the contacts corresponding to more or less illumination.

Since the photosensitive means are situated on or in a mobile module, this module may be placed at the location where the user wishes to have the desired illumination, for example over a working surface, a desk, a bedside table, etc.

The reference value of a light level need not be displayed since it is automatically memorized at the precise instant when the user estimates that the optimum adjustment has been achieved. The recording may be carried out either deliberately by the user, by actuating an appropriate contact, or automatically, without the user's knowledge, when the user ceases to actuate one of the contacts corresponding to more or less illumination.

The transmission of the command from the module to the operating device or devices can be achieved by any known means, especially cordless means.

According to a preferred form of embodiment of the invention, the logical processing unit is housed in the mobile module and the actuating contacts are also on the module.

According to another form of embodiment of the invention, the actuating contacts are placed in a remote control unit enabling the module alone or the module and the operating devices to be remotely controlled.

BRIEF DESCRIPTION OF THE DRAWINGS

The appended drawing represents, as an example, several forms of embodiment of the installation according to the invention.

FIG. 1 represents the block diagram of a first form of embodiment or the basic version.

FIGS. 2 and, 2A, 2B, 2C and 2D represent the flowchart for the software of the basic version.

FIGS. 4, 4A, 4B, 4C represent the flowchart for a variant of the embodiment of the basic version in which the recording of the reference value is automatic.

FIG. 5 represents a block diagram of a second embodiment of the installation comprising a remote control unit with a non-directional transmitter.

FIG. 6 represents the block diagram of an installation according to a third form of embodiment comprising a remote control unit with a directional transmitter.

FIGS. 7, 7A, 7B represent the flowchart for the software of the embodiments represented in FIGS. 5 and 6 in the version with manual recording of the reference value.

FIGS. 8, 8A, 8B, 8C represent the flowchart for the software of the embodiments represented in FIGS. 5 and 6 in the version with automatic recording of the reference value.

FIG. 9 represents a first particular form of embodiment of the mobile module.

FIG. 10 represents a second particular form of embodiment of the mobile module.

FIG. 11 is an electrical circuit diagram illustrating the use of photocells as photosensitive means.

FIG. 12 represents a first variant of the circuit of FIG. 11.

FIG. 13 represents a second variant of the circuit of FIG. 11.

DESCRIPTION OF THE PREFERRED EMBODIMENT(S)

Figure 3:
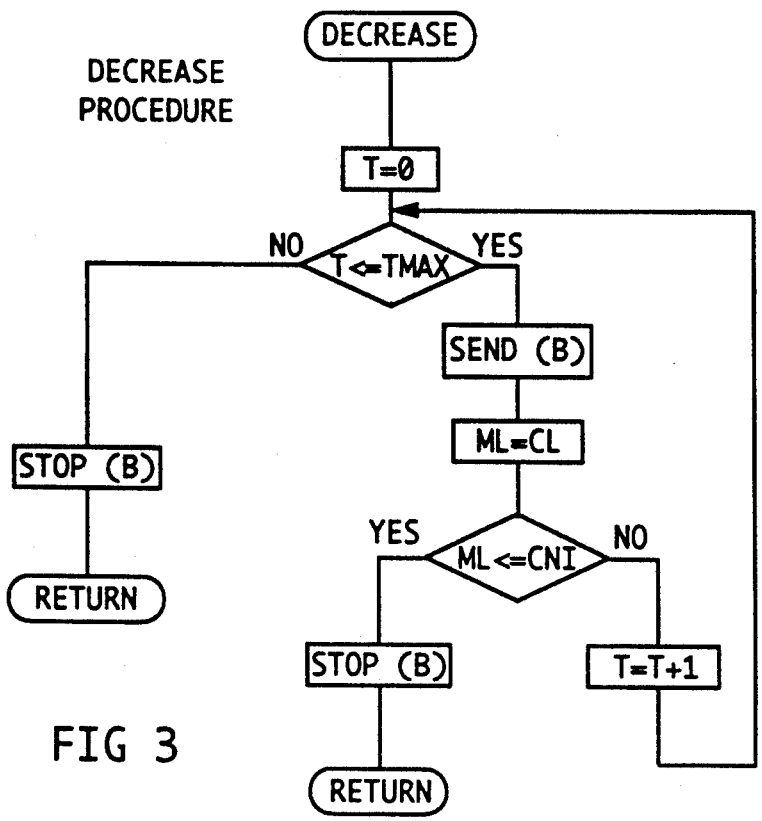
FIGS. 3 and 3A represent, in the form of a flowchart, the detail of the DECREASE and INCREASE procedures.

The installation represented in FIG. 1 mainly comprises a mobile module 1 containing and carrying all the means of control, namely the photosensitive means consisting of a brightness sensor CL, a control processor P, an analog-digital converter CAN making possible the acquisition by the processor system of the analog measurement of the illumination measured by CL, a transmitter E and a keypad CC with three keys PA, PB and PC. The key PA actuates a contact controlling the opening of a blocking means, the key PB actuates a contact for closing this means, while the key PC actuates a contact for sending the reference value of the illumination to the memory.

The processor P contains a microprocessor, some random-access memory, a program memory and parallel input-output circuits. Part of the random-access memory is backed up by a battery or in an EEPROM. The various functions P and CAN may be provided by a microcontroller of the MICRO 8051 or INTEL 68HC11 family. A clock HO sends a logic signal which makes it possible to reactivate the processor periodically, the latter thus being put into sleep mode after each use so as to reduce consumption.

The mobile module 1 is intended to control at least one operating device OP through the intermediary of a receiver OPR and an interface OPI. The transmitter E of the mobile module and the receiver OPR are of course matched to one another in order to ensure cordless transmission by any known means, for example of the infra-red or radio-frequency electromagnetic type.

In order to record a reference value, the user actuates one of the keys PA or PB until he estimates that a satisfactory level of illumination has been reached. He then actuates the key PC in order to record the reference value. The recording is preferably made a few fractions of a second after the push-button PC has been released, this being in order to preclude any perturbation of the measurement of the light level by the movement of the user's hand.

The contacts corresponding to the keys PA and PB and to the push-button PC, and similarly the clock HO, are connected to inputs of the parallel port of the processor P. The handling of these inputs can be carried out according to any known method, by scanning or by interrupts. Interrupt handling is the method that has been adopted in the example described. The software module is represented in the form of a flowchart in FIGS. 2, 2A, 3, 3A.

The variables used are as follows:
A = command of the type "open".
B = command of the type "close".
CL = value measured on the brightness sensor.
CNL = memorized reference value of the light level.
ML = memorized value of CL at the current instant.
H = hysteresis in the light level.
TMAX = maximum time required for the complete manoeuvre of the blocking means.
T = variable from 0 to TMAX.

The Initialize procedure makes it possible to configure the processor.

The Sleep procedure makes it possible to change to the sleep mode.

The Send (X) procedure makes it possible to send the command X (A or B) through the intermediary of the transmitter (E).

The Stop (X) procedure makes it possible to stop sending the previous command.

The Tempo procedure makes it possible to generate a waiting time of the order of one second.

Exit from the Sleep mode is achieved by a reset or interrupt.

Figure 3A:
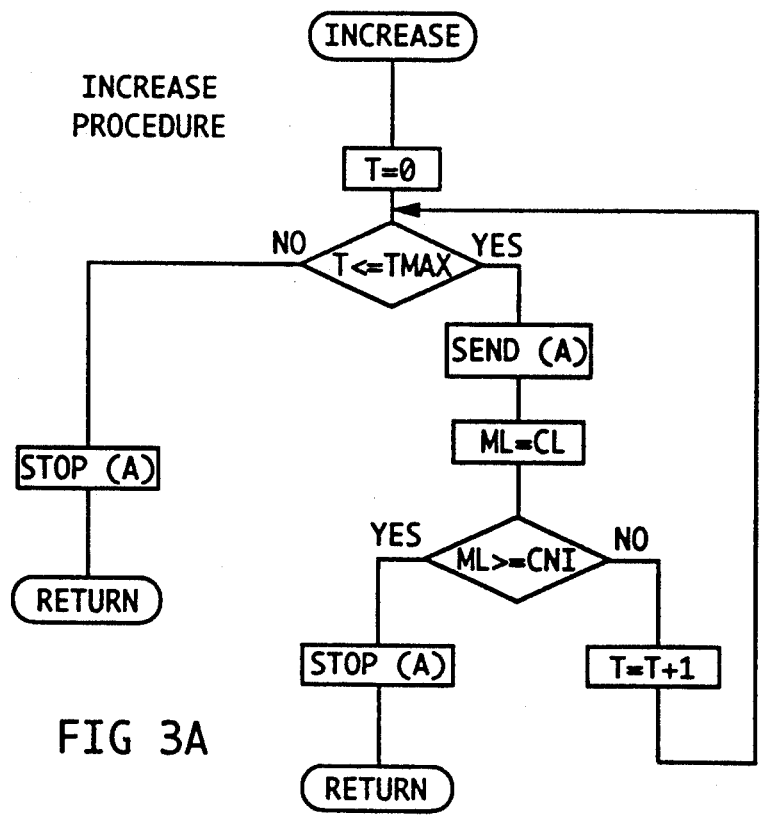

The flowcharts for the INCREASE and DECREASE procedures in the flowchart of FIGS. 2 and 2A are reproduced in FIGS. 3 and 3A.

According to a variant of the embodiment, the reference value is not recorded by actuating a push-button, but automatically, without the user's knowledge, a few fractions of a second after one of the keys PA or PB has been released. The arrangement of the equipment is the same as that represented in FIG. 1 without the key PC. The software module, on the other hand, is different. This is represented in the form of a flowchart in FIGS. 4, 4A, 4B, 4C.

The sub-routine SPRG 1 is activated automatically after the sub-routines INT 1 or INT 2 have been run. The TEMPO procedure generates a waiting time, so that the reference value is only recorded a few fractions of a second after the key PA or PB has been released, this being in order to preclude any perturbation of the measurement of the light level by the user's hand passing near the photoelectric cell.

In the second form of embodiment represented in FIG. 5, the installation incorporates a remote control unit TC consisting of the control keys PA and PB and, depending on the form of embodiment, the push-button PC. The remote control unit TC consists of a non-directional transmitter of the same type as the transmitter E in the module and the module incorporates a receiver R intended to receive the signals from the remote control unit TC. The remote control unit TC can therefore be an existing remote control unit for the remote control of the receivers OPR of the operating devices.

In the mobile module 1, the keypad is replaced by a receiver R of the same type as the receiver OPR of the devices for operating the blocking means. This receiver R can decode the signals received and possesses at least two logic outputs SRA and SRB activated during the detection of the transmission of a command "Open" or a command "Close", together with a third output SRC activated during the actuation of the contact PC in the case where the remote control unit is equipped with such a contact. These logic signals are applied to the processor P instead of the signals PA, PB and PC.

FIGS. 7, 7A, 7B represent the flowchart of the version with manual recording of the reference value, that is to say the version in which the remote control unit includes the key PC.

FIGS. 8, 8A, 8B, 8C represent the flowchart of the version with automatic recording of the reference value, that is to say the version in which the remote control unit is not equipped with the key PC.

The INCREASE and DECREASE procedures are the same as in the first form of embodiment.

The signals from the remote control unit TC therefore directly control the devices operating the blocking means.

In the third form of embodiment represented in FIG. 6, a remote control unit TCD is also provided, but it incorporates a directional transmitter. The user must therefore point the transmitter of the remote control unit in the direction of the mobile module 1 and it is the module which re-transmits the signal towards the receiver OPR of the operating device through its transmitter E. In order to ensure this dual function of the transmitter E, an OR circuit is provided between the transmitter, on the one hand, and the receiver R and the processor P, on the other hand, as is represented in FIG. 6. The remainder of the embodiment of the module 1 is identical to that in FIG. 5.

The flowcharts corresponding respectively to the versions with manual and automatic recording of the reference value are the same as for the previous mode of embodiment.

It is also possible to use a directional remote control unit TCD with the module of FIG. 5. In this case, the flowcharts are those of FIGS. 2 and 4, depending on whether the reference value is recorded automatically or not, in which PA, PB, (PC) are replaced respectively by SRA, SRB, (SRC).

In order to preclude objects being deposited on the brightness sensors, the mobile module preferably has an elongated shape in the vertical direction, for example a pyramidal or conical shape as represented in FIG. 9. The brightness sensors CL are placed in the upper part of the module. In the example in question, they are connected by wires to a circuit 2 placed on the base of the pyramid. The keys, not represented, are mounted on one of the faces of the pyramid near its base.

In the form of embodiment represented in FIG. 10, the mobile unit 1 also has a pyramidal or conical shape, the central part of which is formed by a light trap and light guide 3, the brightness sensor then being mounted directly on the circuit 2.

The control circuit can be supplied by photocells. In this case, the photocells can also be used to provide for the analog measurement of the illumination. This requires the photocells to be temporarily short-circuited during the periods when the illumination is being measured. A circuit providing these functions is represented, as an example, in FIG. 11. The circuit consists of a certain number of photocells P1 through P4 in series between the transmitter of a transistor T2 and a diode D whose other terminal is connected to a capacitor C. This capacitor C is charged by the photocells to a voltage Vcc which is the supply voltage of the control module. The photocells are short-circuited by a transistor T1 controlled by a transistor T2 itself controlled by an output ST from the parallel port of the processor P. When ST=1, T2 is saturated and T1 conducts, and the photocells are at a potential close to zero if the operational amplifier OA is not saturated. At the output of this amplifier, a quantity CL representing the value of the illumination is then measured. The diode D prevents the discharge of the capacitor C during this measurement of the illumination.

The capacitor C and the diode D can be replaced by any of the standard known devices, for example by a capacitor associated with a charge control circuit (FIG. 12) or by a battery and a diode (FIG. 13).

In the examples described, it is possible, without anything else, to replace the devices operating the blocking means by artificial illumination means.

Transmission between the module and the operating device may be provided by a twin-cable connection.

According to another variant of the embodiment, the logical processing unit may be located outside the mobile module, in particular at a fixed point, and connected to the module by an electrical connection or by a cordless connection.

We claim:

1. An installation for the control of the level of illumination of premises provided with at least one opening allowing natural light to enter and equipped with means of blocking said opening and/or with means of artificial illumination, comprising control operating devices, photosensitive means for measuring the level of illumination of said premises, said photosensitive means connected to said control devices, means for the automatic control of the operating devices controlled by the photosensitive means as a function of a reference value of illumination, means for adjusting and storing said reference value of illumination, a manual switch connected to the operating devices to command the operating devices to adjust the illumination, and to adjust said reference value, wherein the means of automatic control has a logical processing unit electrically connected to the photosensitive means, to the switch and to the operating devices, said logical processing unit being programmed to read the state of the switches and the values measured by the photosensitive means and to emit signals to adjust the illumination in one instance as a function of the state of said switch and in a second instance as a function of the difference between the reference value and the value measured by the photosensitive means, the program of the logical processing unit comprising a sub-routine to record a value of the illumination measured by the photosensitive means, in a memory section at an instant determined by the user, said sub-routine being activated either manually by a second switch, or automatically, and wherein the photosensitive means is placed on or in a mobile module.

2. The installation as claimed in claim 1, wherein the logical processing unit is also in the mobile module.

3. The installation as claimed in claim 1, wherein the program of the logical processing unit also incorporates a sub-routine activated by a "more illumination" switch and a sub-routine activated by a "less illumination" switch to enable the operating devices to be brought into a state so as to create the desired illumination and a sub-routine activated by an external clock for the periodic reactivation of the processor of the LPU.

4. The installation as claimed in claim 1, wherein the mobile module comprises a transmitter connected to the output of the logical processing unit and wherein each operating device is associated with a receiver receiving the signals transmitted by said transmitter.

5. The installation as claimed in claim 4, wherein the switches which can be actuated manually are placed on the mobile module.

6. The installation as claimed in claim 4, wherein the switches which can be actuated manually are placed on a second mobile module independent of said mobile module and wherein the mobile module incorporates a receiver provided to receive the signals transmitted by the second mobile module, said second mobile module includes a second transmitter to read the states of the switches and to transmit signals corresponding to more and less light and a signal for recording the reference value.

7. The installation as claimed in claim 6, wherein the second transmitter is directional and wherein said receiver receives the signals from the second mobile module and transmits them simultaneously to the second transmitter and to the logical processing unit for their transmission to the operating device in one instance and for their processing by the LPU.

8. The installation as claimed in claim 6, wherein the second transmitter is directional and wherein the receiver of the mobile module is provided in order to receive the signals from the second mobile module and transmit them to the logical processing unit.

9. The installation as claimed in 6, wherein the second transmitter is non-directional and wherein the logical processing unit is programmed in such that its output is not activated when the signals emanating from the "more" or "less" switches are transmitted by the second mobile module.

10. The installation as claimed in claim 1, wherein the mobile module has an elongated pyramidal or conical shape in the vertical direction and photoelectric cells adjacent the top.

11. The installation as claimed in claim 1, wherein the mobile module has an elongated pyramidal or conical shape in the vertical direction and incorporates a light trap.

12. The installation as claimed in claim 1, wherein the photosensitive means are photocells which provide the power supply for the module and means for temporarily short-circuiting the photocells during the measurement of the level of illumination.

13. The installation of claim 12 wherein said photocells provide the power supply for the logical processing unit and said logical processing unit being located outside of said mobile module.

* * * * *